US011873401B2

(12) United States Patent
Otsuka et al.

(10) Patent No.: US 11,873,401 B2
(45) Date of Patent: Jan. 16, 2024

(54) EASILY TEARABLE FILM, MULTILAYER FILM, PACKAGING MATERIAL, AND CONTAINER

(71) Applicant: Mitsubishi Gas Chemical Company, Inc., Tokyo (JP)

(72) Inventors: Kosuke Otsuka, Hiratsuka (JP); Kaname Sato, Hiratsuka (JP); Takafumi Oda, Hiratsuka (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 425 days.

(21) Appl. No.: 16/635,445

(22) PCT Filed: Jun. 29, 2018

(86) PCT No.: PCT/JP2018/024808
§ 371 (c)(1),
(2) Date: Jan. 30, 2020

(87) PCT Pub. No.: WO2019/026500
PCT Pub. Date: Feb. 7, 2019

(65) Prior Publication Data
US 2021/0102065 A1    Apr. 8, 2021

(30) Foreign Application Priority Data
Jul. 31, 2017    (JP) .................... 2017-147836

(51) Int. Cl.
*C08L 77/06* (2006.01)
*B32B 7/02* (2019.01)
(Continued)

(52) U.S. Cl.
CPC ............... *C08L 77/06* (2013.01); *B32B 7/12* (2013.01); *B32B 27/08* (2013.01); *B32B 27/32* (2013.01);
(Continued)

(58) Field of Classification Search
CPC ............ B32B 2250/03; B32B 2250/24; B32B 2255/10; B32B 2307/582;
(Continued)

(56) References Cited

U.S. PATENT DOCUMENTS

2009/0239013 A1* 9/2009 Otaki .................... B29B 9/12
428/36.6
2011/0144256 A1 6/2011 Mathew et al.
2012/0301650 A1 11/2012 Takashige

FOREIGN PATENT DOCUMENTS

CN 102811922 A 12/2012
EP 0540293 A1 5/1993
(Continued)

OTHER PUBLICATIONS

Machine translation of JP 2007/099999; Ohashi et al., Apr. 19, 2007 (Year: 2007).*

(Continued)

*Primary Examiner* — Frances Tischler
(74) *Attorney, Agent, or Firm* — Fitch, Even, Tabin & Flannery LLP (57) ABSTRACT

An easily tearable film with excellent linear cuttability, as well as a multilayer film, a packaging material, and a container are provided. The easily tearable film is a polyamide resin film including polyamide resin components including more than 20 parts by mass and 70 parts by mass or less of a semi-aromatic polyamide resin A and less than 80 parts by mass and 30 parts by mass or more of an aliphatic polyamide resin B; wherein the semi-aromatic polyamide resin A is constituted of a diamine-derived constituent unit and a dicarboxylic acid-derived constituent unit; 60 mol % or more of the diamine-derived constituent units are derived from metaxylylenediamine; 60 mol % or more of the dicarboxylic acid-derived constituent units are derived from an α,ω-linear aliphatic dicarboxylic acid having from (Continued)

4 to 10 carbons; and the polyamide resin film is stretched, the polyamide resin film having an area fraction corresponding to the semi-aromatic polyamide resin A, as observed in secondary electron image observation, of 9.8% or more after plane ion milling of a cross section of the polyamide resin film in the TD direction.

10 Claims, 7 Drawing Sheets

(51) Int. Cl.
 B32B 27/08 (2006.01)
 B32B 27/32 (2006.01)
 B32B 27/34 (2006.01)
 B32B 27/36 (2006.01)
 C08L 77/02 (2006.01)
 B32B 7/12 (2006.01)
(52) U.S. Cl.
 CPC .............. *B32B 27/34* (2013.01); *B32B 27/36* (2013.01); *C08L 77/02* (2013.01); *B32B 2250/03* (2013.01); *B32B 2307/582* (2013.01); *B32B 2307/7242* (2013.01); *B32B 2439/40* (2013.01); *B32B 2439/70* (2013.01); *B32B 2439/80* (2013.01); *C08L 2203/16* (2013.01); *C08L 2205/025* (2013.01)
(58) Field of Classification Search
 CPC ...... B32B 2307/7242; B32B 2307/732; B32B 2439/00; B32B 2439/40; B32B 2439/60; B32B 2439/70; B32B 2439/80; B32B 27/08; B32B 27/18; B32B 27/20; B32B 27/22; B32B 27/32; B32B 27/34; B32B 27/36; B32B 7/12; C08J 2377/02; C08J 2377/06; C08J 2477/06; C08J 5/18; C08L 2203/16; C08L 2205/025; C08L 77/02; C08L 77/06
 See application file for complete search history.

(56) References Cited

FOREIGN PATENT DOCUMENTS

| | | | |
|---|---|---|---|
| EP | 2532603 | A1 | 12/2012 |
| JP | H10-287753 | A | 10/1998 |
| JP | 2007-098859 | A | 4/2007 |
| JP | 2007-099999 | A | 4/2007 |
| JP | 2008-056841 | A | 3/2008 |
| JP | 2010-070217 | A | 4/2010 |
| JP | 2013-203414 | A | 10/2013 |
| JP | 2015-150842 | A | 8/2015 |
| WO | 2011/096333 | A1 | 8/2011 |
| WO | 2013/002069 | A1 | 1/2013 |
| WO | 2014/021418 | A1 | 2/2014 |

OTHER PUBLICATIONS

Machine translation of WO 2013/002069, Mitsubishi Gas Chemical Co, Feb. 23, 2015 (Year: 2015).*

Mitsubishi_MX_nylon_S6007.pdf; retrieved from https://www.mgc.co.jp/eng/products/ac/nmxd6/grade.html on Jul. 22, 2022 (Year: 2022).*

International Preliminary Report on Patentability and Written Opinion for PCT/JP2018/024808, dated Sep. 25, 2018, and English Translation submitted herewith (22 pages).

International Search Report for PCT/JP2018/024808, dated Sep. 25, 2018, and English Translation submitted herewith (7 pages).

Extended European Search Report issued in corresponding European Application No. 18841443.7 dated Aug. 19, 2020 (10 pages).

WPI Database, Week 200739, Thompson Scientific, XP002799652 abstract for JP Publication No. 2007-098859 A (2 pages).

Office Action issued in corresponding Chinese Application No. 201880050372.1 dated Dec. 22, 2021 (7 pages).

Office Action issued in corresponding Japanese Application No. 2019-533979 dated Jun. 7, 2022 (9 pages).

* cited by examiner

EASILY TEARABLE FILM, MULTILAYER FILM, PACKAGING MATERIAL, AND CONTAINER

CROSS-REFERENCE TO RELATED APPLICATIONS

This application is a U.S. national phase application filed under 35 U.S.C. § 371 of International Application Number PCT/JP2018/024808, filed Jun. 29, 2018, designating the United States, which claims priority from Japanese Application Number 2017-147836, filed Jul. 31, 2017.

Field of the Invention

The present invention relates to an easily tearable film, as well as a multilayer film, a packaging material, and a container produced using the easily tearable film.

Background of the Invention

To prevent deterioration of products, such as foods and pharmaceuticals, and store them for a long period of time, packaging materials with excellent gas barrier properties are used for packaging foods and the like. In addition, although plastic films are much used as materials for packaging products, such as foods, a plastic film for a packaging material alone often fails to achieve sufficient gas barrier performance. Accordingly, a packaging material is produced by laminating a plastic film having gas barrier properties on a plastic film for a packaging material.

However, a packaging material obtained by laminating a plastic film as described above may not be opened by tearing linearly, and when such a packaging material is opened obliquely, the content, if it is liquid, sometimes leaks out.

Accordingly, multilayer films with excellent linear cuttability have been studied. For example, Patent Document 1 discloses a linearly cuttable gas barrier package formed by laminating a biaxially stretched film (I) having linear cuttability in the longitudinal direction of the film, a gas barrier layer (II), a laminate adhesive layer (III), and a sealant layer (IV) in this order; characterized in that the biaxially stretched film (I) is a film containing nylon 6 and poly (metaxylylene adipamide) in a mass ratio [nylon 6/poly (metaxylylene adipamide)] from 80/20 to 95/5 or the biaxially stretched film (I) is a film containing a polyethylene terephthalate (PET) and a modified polybutylene terephthalate (modified PBT) in a mass ratio (PET/modified PBT) from 70/30 to 95/5, wherein the modified PBT is a polybutylene terephthalate containing from 5 to 20 mass % of a polytetramethylene glycol unit having a molecular weight from 600 to 4000; and the gas barrier layer (I) contains an inorganic layered compound (A) and a resin (B) in a volume ratio [inorganic layered compound (A)/resin (B)] from 3/97 to 7/93.

CITATION LIST

Patent Document

Patent Document 1: JP 2013-203414 A

SUMMARY OF INVENTION

However, the package in Patent Document 1 was found not to necessarily achieve sufficient linear cuttability. An object of the present invention is to solve such problems and thus to provide an easily tearable film with excellent linear cuttability, which contains a semi-aromatic polyamide resin, such as a poly(metaxylylene adipamide), and an aliphatic polyamide resin, as well as a multilayer film, a packaging material, and a container produced using the easily tearable film.

As a result of investigations performed by the present inventor based on the above problems, it was found that the above problems can be solved by stretching a polyamide resin film in an easily tearable film containing a semi-aromatic polyamide resin and an aliphatic polyamide resin, the polyamide resin having an area fraction corresponding to a semi-aromatic polyamide resin A, as observed in secondary electron image observation, of 9.8% or more after plane ion milling of a cross section in the transverse direction (TD direction). Specifically, the above problems have been solved by the following means (1) and preferably by (2) to (10).

(1) An easily tearable film, which is a polyamide resin film including polyamide resin components including more than 20 parts by mass and 70 parts by mass or less of a semi-aromatic polyamide resin A and less than 80 parts by mass and 30 parts by mass or more of an aliphatic polyamide resin B, with the proviso that a sum of the semi-aromatic polyamide resin A and the aliphatic polyamide resin B is 100 parts by mass; wherein the semi-aromatic polyamide resin A is constituted of a diamine-derived constituent unit and a dicarboxylic acid-derived constituent unit; 60 mol % or more of the diamine-derived constituent units are derived from metaxylylenediamine; 60 mol % or more of the dicarboxylic acid-derived constituent units are derived from an α,ω-linear aliphatic dicarboxylic acid having from 4 to 10 carbons; and the polyamide resin film is stretched, the polyamide resin film having an area fraction corresponding to the semi-aromatic polyamide resin A, as observed in secondary electron image observation, of 9.8% or more after plane ion milling of a cross section of the polyamide resin film in the TD direction.

(2) The easily tearable film according to (1), wherein the area fraction is from 9.8 to 35.0%.

(3) The easily tearable film according to (1) or (2), wherein a constituent unit including a linear alkylene chain having from 4 to 6 carbons accounts for 80 mol % or more of all the constituent units of the aliphatic polyamide resin B.

(4) The easily tearable film according to any one of (1) to (3), wherein the aliphatic polyamide resin B includes polyamide 6.

(5) The easily tearable film according to any one of (1) to (4), wherein 60 mol % or more of the dicarboxylic acid-derived constituent units are derived from adipic acid.

(6) The easily tearable film according to any one of (1) to (5), wherein the semi-aromatic polyamide resin A has a molar concentration of phosphorus atoms from 0.01 to 10 μmol/g, a molar concentration of sodium atoms from 0.05 to 20 μmol/g, a molar concentration of potassium atoms of 20 μmol/g or less, a molar concentration of calcium atoms of 10 μmol/g or less, and a number average molecular weight from 19000 to 50000; and the aliphatic polyamide resin B includes polyamide 6.

(7) A multilayer film including the easily tearable film described in any one of (1) to (6).

(8) The multilayer film according to (7), including a polyester resin layer, the easily tearable film, and a polyolefin resin layer in this order.

(9) A packaging material including the easily tearable film described in any one of (1) to (6) or the multilayer film described in (7) or (8).

(10) A container including the easily tearable film described in any one of (1) to (6) or the multilayer film described in (7) or (8).

According to the present invention, an easily tearable film with excellent linear cuttability, as well as a multilayer film, a packaging material, and a container produced using the easily tearable film can be provided.

DESCRIPTION OF EMBODIMENTS

The contents of the present invention will be described in detail below. In the present specification, "from . . . to . . . " or " . . . to . . . " is used to mean that the numerical values described before and after "to" are included as the lower limit value and the upper limit value, respectively.

An easily tearable film of the present invention is characterized in that the easily tearable film includes polyamide resin components including more than 20 parts by mass and 70 parts by mass or less of a semi-aromatic polyamide resin A and less than 80 parts by mass and 30 parts by mass or more of an aliphatic polyamide resin B, with the proviso that a sum of the semi-aromatic polyamide resin A and the aliphatic polyamide resin B is 100 parts by mass; and is characterized in that the semi-aromatic polyamide resin A is constituted of a diamine-derived constituent unit and a dicarboxylic acid-derived constituent unit; 60 mol % or more of the diamine-derived constituent units are derived from metaxylylenediamine; 60 mol % or more of the dicarboxylic acid-derived constituent units are derived from an α,ω-linear aliphatic dicarboxylic acid having from 4 to 10 carbons; a polyamide resin film has an area fraction corresponding to the semi-aromatic polyamide resin A, as observed in secondary electron image observation, of 9.8% or more after plane ion milling of a cross section of a polyamide resin film in the TD direction; and the polyamide resin film is stretched.

With such a constitution, a film with excellent linear cuttability is obtained. The mechanism, even if it is an estimation, is considered as follows. That is, after a cross section, in the TD direction, of the polyamide resin film containing the semi-aromatic polyamide resin A and the aliphatic polyamide resin B is subjected to a cutting treatment by plane ion milling under predetermined conditions, the area fraction corresponding to the semi-aromatic polyamide resin A as observed in secondary electron image observation by scanning electron microscope (SEM) is estimated to represent a proportion of the semi-aromatic polyamide resin A region that actually contributes to the linear cuttability. By setting this area fraction precisely, a film with improved linear cuttability can be provided.

Figure 1:
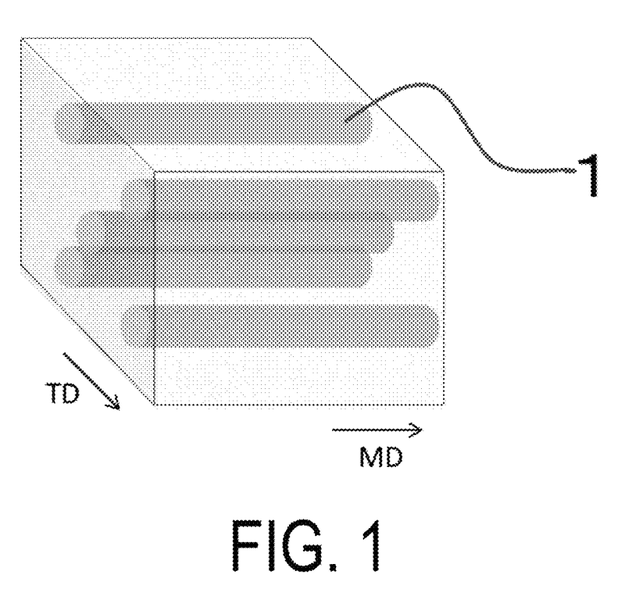
FIG. 1 is a conceptual diagram illustrating a reflected electron image as observed by scanning electron microscope (SEM) after electron staining of a polyamide resin film.

More specifically, the morphology of a polyamide resin film is typically observed in a reflected electron image by SEM after electron staining. In a case where a polyamide resin film is observed in a reflected electron image, a linear region 1 can be observed in the machine direction (MD direction), as illustrated in FIG. 1. This linear region 1 is considered to be the semi-aromatic polyamide resin A, and it is thought that when the polyamide resin film is torn along the MD direction, this linear region 1 is torn and linear cutting is achieved.

Figure 2:
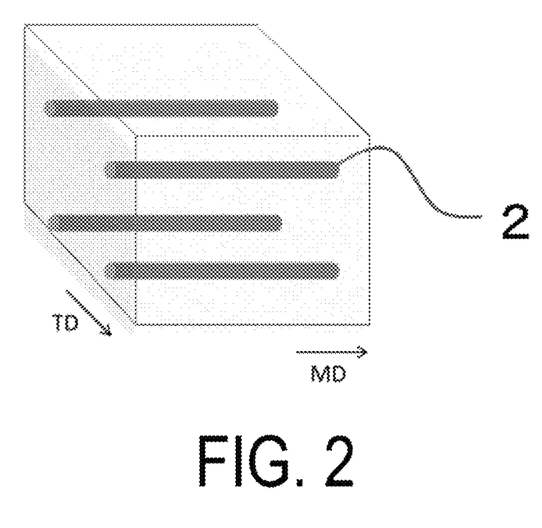
FIG. 2 is a conceptual diagram illustrating a secondary electron image as observed by SEM after plane ion milling of a polyamide resin film.
Figure 3:
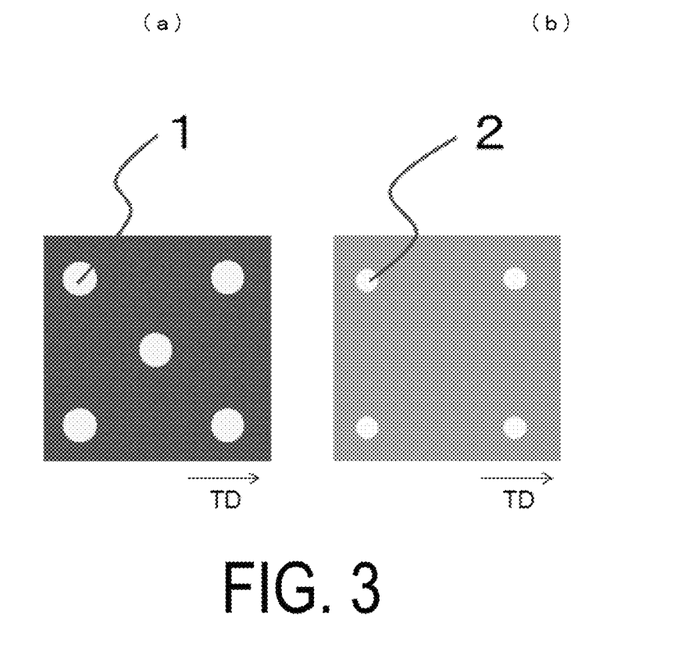
FIG. 3 includes conceptual diagrams illustrating film cross-sections of the polyamide resin films of FIG. 1 and FIG. 2 as viewed from the MD direction.

The present inventor found, however, when the same polyamide resin film is observed in a secondary electron image by SEM after plane ion milling, that a linear region 2 in the MD direction became narrower as illustrated in FIG. 2. Furthermore, this trend was more prominently observed when observed from the TD direction. As illustrated in FIG. 3, when a secondary electron image was observed by SEM after plane ion milling of the film cross section in the TD direction, the area of the region 2, which is estimated to be the semi-aromatic polyamide resin A, was found to be smaller than the area of the region 1 observed in an reflected electron image. Here, FIG. 3A illustrates a cross-sectional view of a film in the TD direction when a reflected electron image was observed after electron staining, and FIG. 3B illustrates a film cross-sectional view of a polyamide resin film when a secondary electron image was observed after a cross section of the film in the TD direction was cut by ion milling under predetermined conditions. The cause of such a difference in the area of the region derived from the polyamide A depending on the combination of the pretreatment of the polyamide resin film and the observation conditions of SEM is estimated as follows. For the observation conditions of SEM, the reflected electron image observation greatly reflects a difference in the resin composition (chemical composition), whereas the secondary electron image observation reflects unevenness of a sample surface. When a reflected electron image is observed after a sample is pretreatment by electron staining (FIG. 1 and FIG. 3A), a region where the aliphatic polyamide and the semi-aromatic polyamide are miscible and a region where they are not miscible both contain a certain amount or more of the semi-aromatic polyamide resin A and result in similar staining states, and thus both regions observed are similar and cannot be distinguished.

In contrast, when a sample is pretreated through cutting treatment by ion milling, a cutting speed differs between a soft region and a hard region with the cutting speed being high in the soft region and low in the hard region. In the present polyamide resin film, it is estimated that the semi-aromatic polyamide resin A is a relatively hard resin, the aliphatic polyamide resin B is a relatively soft resin, and the portion where these resins are miscible has a softness therebetween. Thus, when a sample of the polyamide resin film is pretreated by ion milling, the aliphatic polyamide resin B, the miscible region, and the semi-aromatic polyamide resin A are cut in this order, and as a result, a region where the resins are hardly miscible and a hard region of the polyamide A remain. Then, when this film cross section after the ion milling processing is examined in a secondary observation image of SEM, which easily reflects surface unevenness, the aliphatic polyamide B and the portion where the resins are miscible have been scraped off, and thus only the region where the resins are hardly miscible and the hard region derived from the polyamide A are observed. The above were estimated to explain why the region 1 observed in a secondary electron image of SEM after electron staining appears thicker than the region 2 observed in a reflected electron image of SEM after ion milling.

Figure 4:
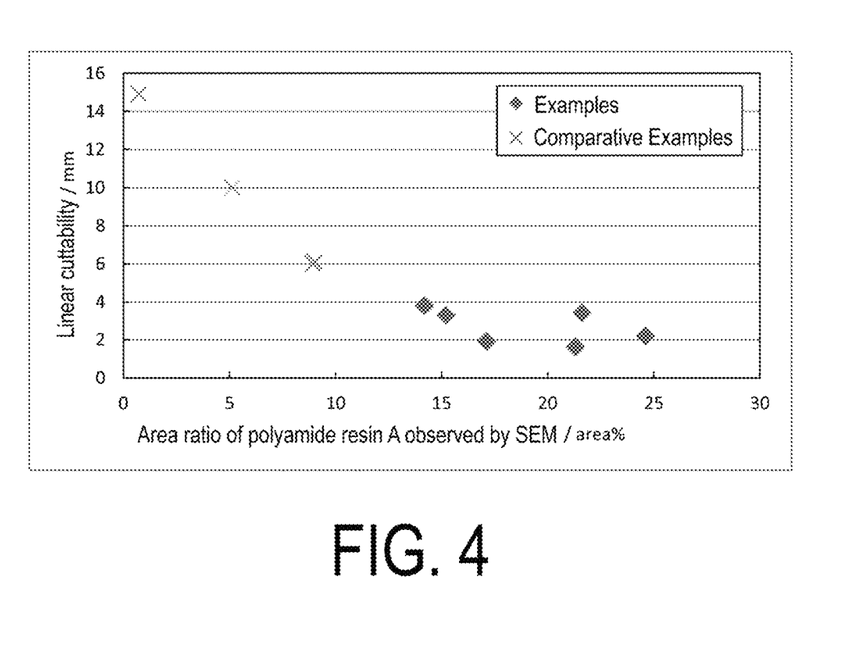
FIG. 4 is a graph plotting Examples 1 to 6 and Comparative Examples 1 to 4 of the present invention.

In addition, as a result of a further investigation performed by the present inventor, it was found that the portion where the resins are miscible is not the hard polyamide resin region and thus has poor linear cuttability. Further, it was estimated that in a case where a secondary electron image of a sample subjected to a cutting treatment by ion milling is observed by SEM, the region 2 of the hard semi-aromatic polyamide resin A that actually contributes to the linear cuttability can be observed. Furthermore, as a result of an investigation performed by the present inventor, it was found that when an area fraction corresponding to the hard semi-aromatic polyamide resin A observed in secondary electron image observation is 9.8% or more after plane ion milling, the linear cuttability is significantly improved in comparison with samples having the area fraction of less than 9.8%, as illustrated in FIG. 4, and the present invention has been completed. In FIG. 4, the cross marks illustrate results of samples having the area fraction of less than 9.8%, and the diamond marks illustrate results of samples having the area fraction of more than 9.8%.

Furthermore, by blending the semi-aromatic polyamide resin A and the aliphatic polyamide resin B at a predetermined proportion, an easily tearable film having a low oxygen permeability coefficient, i.e., an easily tearable film with excellent oxygen barrier properties can be obtained.

Semi-Aromatic Polyamide Resin A

The semi-aromatic polyamide resin A used in the present invention (which may be referred to as the "polyamide A" in the present specification) is constituted of a diamine-derived constituent unit and a dicarboxylic acid-derived constituent unit, where 60 mol % or more of the diamine-derived constituent units are derived from metaxylylenediamine, and 60 mol % or more of the dicarboxylic acid-derived constituent units are derived from an α,ω-linear aliphatic dicarboxylic acid having from 4 to 10 carbons.

Here, the "semi-aromatic polyamide resin" refers to a polyamide resin in which from 30 to 70 mol % of total constituent units of the diamine-derived constituent units and the dicarboxylic acid-derived constituent units are constituent units containing an aromatic ring, and preferably from 40 to 60 mol % of the total constituent units of the diamine-derived constituent units and the dicarboxylic acid-derived constituent units are constituent units containing an aromatic ring.

The molar concentration of phosphorus atoms contained in the semi-aromatic polyamide resin A is preferably 0.01 μmol/g or more, more preferably 0.05 μmol/g or more, and still more preferably 0.1 μmol/g or more. In addition, the upper limit value of the molar concentration of the phosphorus atoms is preferably 10 μmol/g or less, more preferably 8 μmol/g or less, still more preferably 6 μmol/g or less, even more preferably 5 μmol/g or less, even still more preferably 1 μmol/g or less, and further still more preferably 0.5 μmol/g or less. With such a range, a film with high linear cuttability, low degree of yellowness (YI), and superior productivity is obtained.

The total molar concentration of an alkali metal atom contained in the semi-aromatic polyamide resin A is preferably 0.05 μmol/g or more, more preferably 0.1 μmol/g or more, and still more preferably 0.2 μmol/g or more. The upper limit value of the total molar concentration of the alkali metal atom is preferably 20 μmol/g or less and more preferably 18 μmol/g or less, and may be even 1.0 μmol/g or less, 0.7 μmol/g or less, or 0.5 μmol/g or less. With such a range, a film with superior linear cuttability and productivity is obtained.

The molar concentration of sodium atoms contained in the semi-aromatic polyamide resin A is preferably 0.05 μmol/g or more, more preferably 0.1 μmol/g or more, and still more preferably 0.2 μmol/g or more. In addition, the upper limit value of the molar concentration of the sodium atoms is preferably 20 μmol/g or less, more preferably 18 μmol/g or less, still more preferably 10 μmol/g or less, even more preferably 7 μmol/g or less, even still more preferably 5 μmol/g or less, further still more preferably 1 μmol/g or less, and particularly even more preferably 0.5 μmol/g or less. With such a range, a film with superior linear cuttability and productivity is obtained.

The molar concentration of potassium atoms contained in the semi-aromatic polyamide resin A is preferably 20 μmol/g or less and more preferably 10 μmol/g or less, and may be even 1 μmol/g or less, particularly 0.1 μmol/g or less, and more particularly 0.01 μmol/g or less.

With such a range, a film with superior linear cuttability and productivity is obtained. The lower limit value of the molar concentration of the potassium atoms may be 0 μmol/g.

The total molar concentration of alkaline earth metal atoms contained in the semi-aromatic polyamide resin A is preferably 10 μmol/g or less and more preferably 5 μmol/g or less, and may be even 1 μmol/g or less, particularly 0.1 μmol/g or less, and more particularly 0.01 μmol/g or less. With such a range, a film with superior linear cuttability and productivity is obtained. The lower limit value of the total molar concentration of the alkaline earth metal atoms may be 0 μmol/g.

The molar concentration of calcium atoms contained in the semi-aromatic polyamide resin A is preferably 10 μmol/g or less and more preferably 5 μmol/g or less, and may be even 1 μmol/g or less, particularly 0.1 μmol/g or less, and more particularly 0.01 μmol/g or less.

The phosphorus atom concentration as well as the alkali metal atom concentration and the alkaline earth metal atom concentration are measured according to the method described in the examples below. In a case where a measuring device described in the examples is difficult to obtain for a reason, such as discontinuation, another device having equivalent performance can be used. Hereinafter, the same applies to other measurement methods.

The number average molecular weight (Mn) of the semi-aromatic polyamide resin A is preferably 19000 or more, more preferably 20000 or more, still more preferably 21000 or more, even more preferably 21500 or more, and even still more preferably 22000 or more. The upper limit value of the number average molecular weight of the semi-aromatic polyamide resin A is not particularly specified but is, for example, 50000 or less, and even may be 40000 or less, 38000 or less, or 36000 or less. With such a range, a film with superior linear cuttability, moldability, and productivity is obtained.

The number average molecular weight of the semi-aromatic polyamide resin A is measured according to the method described in the examples below.

The semi-aromatic polyamide resin A used in the present invention preferably satisfies at least two of the molar concentration of the phosphorus atoms, the total molar concentration of the alkali metal atoms, and the total molar concentration of the alkaline earth metal atoms, as well as the number average molecular weight, more preferably satisfies at least three thereof, and still more preferably satisfies all thereof.

In particular, the polyamide A used in the present invention preferably satisfies all of the molar concentration of the phosphorus atoms, the sodium atom concentration, the potassium atom concentration, the calcium atom concentration, and the number average molecular weight.

The relative viscosity of the semi-aromatic polyamide resin A is preferably 2.4 or more, more preferably 2.5 or more, and still more preferably 2.6 or more. The upper limit of the relative viscosity is not particularly specified but can be, for example, 4.5 or less and even 4.0 or less. With such a range, a film with superior linear cuttability, moldability, and productivity is obtained.

The relative viscosity is determined by the following method.

First 0.2 g of the polyamide A is precisely weighed and dissolved in 20 mL of 96 mass % aqueous sulfuric acid solution by stirring at 25° C. After complete dissolution, 5 mL of the solution is quickly taken into a Cannon-Fenske viscometer, allowed to stand in a bath at a constant temperature of 25° C. for 10 minutes, and then the drop time (t) of the solution is measured. In addition, the drop time (t0) of the 96 mass % aqueous sulfuric acid solution itself is measured under the same conditions. The relative viscosity is calculated from t and t0 according to the following equation:

Relative viscosity=$t/t0$

The semi-aromatic polyamide resin A is constituted of the diamine-derived constituent unit and the dicarboxylic acid-derived constituent unit as described above. "Being constituted of the diamine-derived constituent unit and the dicarboxylic acid-derived constituent unit" refers to being constituted of the diamine-derived constituent unit and the dicarboxylic acid-derived constituent unit as main components. Thus, it is not completely excluded that the semi-aromatic polyamide resin A contains a constituent unit other than these constituent units, and it goes without saying that the semi-aromatic polyamide resin A may contain a constituent unit derived from a lactam, such as ε-caprolactam or laurolactam, or an aliphatic aminocarboxylic acid, such as aminocaproic acid or aminoundecanoic acid. Here, "main components" refers to that the total of the diamine-derived constituent unit and the dicarboxylic acid-derived constituent unit in the semi-aromatic polyamide resin A is the most abundant components among all the constituent units. In the present invention, the total of the diamine-derived constituent unit and the dicarboxylic acid-derived constituent unit in the semi-aromatic polyamide resin A preferably accounts for 90 mass % or more and more preferably accounts for 95 mass % or more of all the constituent units.

In the semi-aromatic polyamide resin A, 60 mol % or more of the diamine-derived constituent units are derived from metaxylylenediamine. Preferably 80 mol % or more, more preferably 90 mol % or more, and still more preferably 95 mol % or more of the diamine-derived constituent units are derived from metaxylylenediamine.

Diamines other than metaxylylenediamine can be exemplified by aliphatic diamines, such as paraxylylenediamine, tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethyl-hexamethylenediamine, and 2,4,4-trimethylhexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines including an aromatic ring, such as bis(4-aminophenyl)ether, paraphenylenediamine, and bis(aminomethyl)naphthalene. One type, or two or more types thereof in a mixture can be used.

When a diamine other than metaxylylenediamine is used as the diamine component, the proportion thereof is preferably less than 20 mol % and more preferably 10 mol % or less of the diamine-derived constituent units.

In the semi-aromatic polyamide resin A, 60 mol % or more of the dicarboxylic acid-derived constituent units are derived from an α,ω-linear aliphatic dicarboxylic acid having from 4 to 10 carbons. Preferably 80 mol % or more, more preferably 90 mol % or more, and still more preferably 95 mol % or more of the dicarboxylic acid-derived constituent units are derived from an α,ω-linear aliphatic dicarboxylic acid having from 4 to 10 carbons.

The α,ω-linear aliphatic dicarboxylic acid having from 4 to 10 carbons preferably used as the raw material dicarboxylic acid component of the polyamide resin can be exemplified by aliphatic dicarboxylic acids, such as succinic acid, glutaric acid, pimelic acid, suberic acid, azelaic acid, adipic acid, and sebacic acid. One type, or two or more types thereof in a mixture can be used, but among them, adipic acid or sebacic acid is preferred, and adipic acid is more preferred in that the melting point of the polyamide resin is in an appropriate range for molding.

A preferred embodiment of the present invention is exemplified by a form in which 60 mol % or more of the dicarboxylic acid-derived constituent units are derived from adipic acid.

Dicarboxylic acid components other than the α,ω-linear aliphatic dicarboxylic acid having from 4 to 10 carbons can be exemplified by phthalic acid compounds, such as isophthalic acid, terephthalic acid, and orthophthalic acid; and naphthalene dicarboxylic acid compounds, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type, or two or more types thereof in a mixture can be used. When a dicarboxylic acid other than the α,ω-linear aliphatic dicarboxylic acid having from 4 to 10 carbons is used as the dicarboxylic acid component, the proportion thereof is preferably less than 20 mol % and more preferably 10 mol % or less of the dicarboxylic acid-derived constituent units.

In the present invention, the dicarboxylic acid component other than the α,ω-linear aliphatic dicarboxylic acid having from 4 to 10 carbons can be configured to be substantially free of isophthalic acid. "Substantially free" refers to that the content is 2 mol % or less of the dicarboxylic acid component, and the content is preferably 1 mol % or less.

The content of the semi-aromatic polyamide resin A in the easily tearable film of the present invention is preferably more than 20 mass % and more preferably 25 mass % or more. The upper limit value of the content of the semi-aromatic polyamide resin A is preferably 70 mass % or less, more preferably 50 mass % or less, still more preferably less than 50 mass %, even more preferably 45 mass % or less, and even still more preferably 40 mass % or less.

Only one type, or two or more types of the semi-aromatic polyamide resins A may be used. When two or more types thereof are used, the total amount thereof is preferably within the above range.

Method for Producing Semi-Aromatic Polyamide Resin A

Next, an example of a method for producing the semi-aromatic polyamide resin A used in the present invention will be described. The semi-aromatic polyamide resin A used in the present invention is preferably a polyamide resin produced by the method described below, but it goes without saying that the semi-aromatic polyamide resin A is not limited thereto.

The method for producing the semi-aromatic polyamide resin A is exemplified by polycondensation of a diamine and a dicarboxylic acid in the presence of a phosphorus atom-containing compound. The resulting semi-aromatic polyamide resin A synthesized in the presence of a phosphorus atom-containing compound can have the phosphorus atom concentration of the predetermined value.

The polycondensation is typically a melt polycondensation method, and preferably a method involving adding dropwise a raw material diamine to a melted raw material dicarboxylic acid while increasing the temperature under pressure, and polymerizing the mixture while removing water resulting from condensation; or a method involving heating a salt constituted of a raw material diamine and a raw material dicarboxylic acid under pressure in the presence of water, and polymerizing the salt in a melted state while removing the added water and the water resulting from condensation.

The phosphorus atom-containing compound is exemplified by hypophosphorous acid (a monobasic acid), phosphorous acid (a dibasic acid), phosphoric acid (a tribasic acid), polyphosphoric acid, and metal salts thereof.

Among them, the phosphorus atom-containing compound is preferably at least one type selected from alkali metal hypophosphites and alkaline earth metal hypophosphites, more preferably at least one type selected from alkali metal hypophosphites, and still more preferably sodium hypophosphite.

The alkali metal atom is exemplified by sodium, potassium, and lithium, and sodium is preferred. The alkaline earth metal is exemplified by magnesium and calcium.

Examples of the phosphorus atom-containing compound specifically include phosphinic acid compounds, such as dimethylphosphinic acid and phenylmethylphosphinic acid; hypophosphorous acid compounds, such as hypophosphorous acid, sodium hypophosphite, potassium hypophosphite, lithium hypophosphite, magnesium hypophosphite, calcium hypophosphite, and ethyl hypophosphite; phosphonic acid compounds, such as phosphonic acid, sodium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, and potassium ethylphosphonate; phosphonous acid compounds, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite, and ethyl phenylphosphonite; and phosphorous acid compounds, such as phosphorous acid, sodium hydrogen phosphite, sodium phosphite, lithium phosphite, potassium phosphite, magnesium phosphite, calcium phosphite, triethyl phosphite, triphenyl phosphite, and pyrophosphorous acid.

One type, or two or more types of these phosphorus atom-containing compounds in combination can be used. In addition, these phosphorus atom-containing compounds may be hydrates. Moreover, the phosphorus atom-containing compound that can be used in the present invention is not limited to these compounds.

The phosphorus atom-containing compound is compounded in the polycondensation system of the semi-aromatic polyamide resin A preferably in an amount so that the phosphorus atom concentration in the semi-aromatic polyamide resin A is within the above range.

Furthermore, in addition to the phosphorus atom-containing compound, a polymerization rate modifier is preferably added in the polycondensation system of the semi-aromatic polyamide resin A. To prevent coloration of the semi-aromatic polyamide resin A during the polycondensation, a sufficient amount of the phosphorus atom-containing compound needs to be present, which, however, could cause gelation of the polyamide resin. Thus, the polymerization rate modifier is preferably allowed to coexist to adjust the amidation reaction rate as well.

Examples of the polymerization rate modifier include alkali metal hydroxides, alkaline earth metal hydroxides, alkali metal acetates, and alkaline earth metal acetates, and alkali metal acetates are preferred.

The alkali metal atom is exemplified by sodium, potassium, and lithium, and sodium is preferred. The alkaline earth metal atom is exemplified by calcium and magnesium.

Specific examples of the polymerization rate modifier include lithium hydroxide, sodium hydroxide, potassium hydroxide, rubidium hydroxide, cesium hydroxide, magnesium hydroxide, calcium hydroxide, strontium hydroxide, barium hydroxide, lithium acetate, sodium acetate, potassium acetate, rubidium acetate, cesium acetate, magnesium acetate, calcium acetate, strontium acetate, and barium acetate. Among them, at least one type selected from sodium hydroxide, potassium hydroxide, magnesium hydroxide, calcium hydroxide, sodium acetate, potassium acetate, and calcium acetate is preferred, at least one type selected from sodium acetate, potassium acetate, and calcium acetate is more preferred, and sodium acetate is still more preferred.

Only one type, or two or more types of these polymerization rate modifiers in combination can be used.

The temperature of the polycondensation reaction is preferably from 150 to 300° C., more preferably from 160 to 280° C., and still more preferably from 170 to 270° C. With the temperature of the polycondensation reaction within the above range, the polycondensation reaction proceeds rapidly. In addition, thermal decomposition of a monomer, and an oligomer or a polymer during the polycondensation is unlikely to occur, which thus results in favorable properties of the resulting semi-aromatic polyamide resin A.

The time of the polycondensation reaction is typically from 1 to 5 hours after the start of the drop-wise addition of the diamine component. With the polycondensation reaction time within the above range, the molecular weight of the semi-aromatic polyamide resin A can be sufficiently increased, and the coloration of the resulting semi-aromatic polyamide resin A can be further prevented.

The semi-aromatic polyamide resin A obtained as described above is removed from the polymerization vessel and pelletized, and then dried and crystallized as necessary.

In addition, to increase the degree of polymerization of the semi-aromatic polyamide resin A, solid phase polymerization may be further performed. The solid phase polymerization can be performed by a well-known method, and examples thereof include a method involving heating at a temperature of 100° C. or higher and lower than the melting point of the polyamide A under reduced pressure for 1 to 24 hours.

Examples of a heating device that can be suitably used in the drying or solid phase polymerization include a continuous heating drying device; a rotary drum heating device, such as those referred to as a tumble dryer, a conical dryer, or a rotary dryer; and a conical heating device referred to as a Nauta mixer, which is equipped with a rotary blade in the inside thereof; but a well-known device can be used without limitation thereto.

In addition, the polyamide A is melt-kneaded with a compound containing an alkali metal atom in a high concentration and/or a compound containing an alkaline earth metal atom using an extruder or the like into pellets, and then the pellets may be blended with the polyamide A and the aliphatic polyamide resin B. Furthermore, to prevent separation of the polyamide A and the compound containing an alkali metal atom and/or the compound containing an alkaline earth metal atom after dry-blending, a viscous liquid may be adhered to the polyamide A as a spreader, and then the compound containing an alkali metal atom and/or the compound containing an alkaline earth metal atom may be added and mixed. The spreader is not particularly limited, and a surfactant or the like can be used.

Aliphatic Polyamide Resin B (Polyamide B)

The easily tearable film of the present invention contains the aliphatic polyamide resin B (which may be referred to as the "polyamide B" in the present specification).

Examples of the aliphatic polyamide resin B may include polyamide 6, polyamide 46, polyamide 66, polyamide 6,66, polyamide 11, polyamide 12, polyamide 1212, polyamide 1010, polyamide 1012, polyamide 1112, polyamide 610, polyamide 612, polyamide 69, and polyamide 810, and polyamide 6, polyamide 66, and polyamide 6,66 are preferred, and polyamide 6 is more preferred. "Polyamide 6" here refers to a polyamide resin including an ε-caprolactam-derived constituent unit, but may also contain a constituent unit derived from an additional raw material monomer within a range that does not depart from the spirit of the present invention (for example, 5 mol % or less, even 3 mol % or less, and particularly 1 mol % or less). The same applies to other aliphatic polyamide resins B.

More specifically, in the aliphatic polyamide resin B, a constituent unit including a linear alkylene chain having from 4 to 6 carbons preferably accounts for 80 mol % or more (preferably 90 mol % or more) of all the constituent units. Such a polyamide B is exemplified by polyamide 6, polyamide 66, and polyamide 6,66.

The relative viscosity of the aliphatic polyamide resin B is preferably 2.0 or more, more preferably 2.6 or more, and still more preferably 3.0 or more. The upper limit of the relative viscosity is not particularly specified, but a resin with high relative viscosity increases a load of the molding machine, thus a discharge amount must be reduced depending on the configuration of the molding machine, which reduces the productivity. The upper limit of the relative viscosity is, for example, 4.5 or less and can be even 4.0 or less. With such a range, a film having superior impact resistance as a soft packaging material and a superior productivity is obtained.

The content of the aliphatic polyamide resin B in the easily tearable film of the present invention is preferably 30 mass % or more, and more preferably 50 mass % or more, still more preferably more than 50 mass %, even more preferably 55 mass % or more, and even still more preferably 60 mass % or more. The upper limit value of the content of the aliphatic polyamide resin B is preferably less than 80 mass %, and more preferably 75 mass % or less.

Only one type, or two or more types of the aliphatic polyamide resin B may be used. When two or more types thereof are used, the total amount thereof is preferably within the above range.

Blend Ratio of Semi-Aromatic Polyamide Resin A and Aliphatic Polyamide Resin B

In the easily tearable film of the present invention, a blend ratio of the polyamide A and the polyamide B is more than 20 parts by mass and 70 parts by mass or less:less than 80 parts by mass and 30 parts by mass or more, preferably more than 23 parts by mass and 45 parts by mass or less:less than 77 parts by mass and 55 parts by mass or more, and more preferably from 25 parts by mass to 45 parts by mass:from 75 parts by mass to 55 parts by mass. Here, the total amount of the polyamide A and the polyamide B is 100 parts by mass. With such a range, an easily tearable film with superior linear cuttability, oxygen barrier properties, and flexibility is obtained.

Area Fraction Corresponding to Semi-Aromatic Polyamide Resin A Observed in Secondary Electron Image Observation The polyamide resin film used in the present invention has an area fraction corresponding to the semi-aromatic polyamide resin A, as observed in secondary electron image observation, of 9.8% or more after plane ion milling of a cross section of the polyamide resin film in the TD direction. With such an area fraction, an easily tearable film with excellent linear cuttability can be provided.

The area fraction is preferably 10.0% or more and more preferably 14.0% or more, and may be 16.0% or more. The upper limit value of the area fraction is not particularly specified but can be 35.0% or less, and may be 30.0% or less, 28.0% or less, or 26.0% or less.

Examples of the method for adjusting the area fraction to the above range include producing the polyamide resin film by adjusting the blend ratio of the semi-aromatic polyamide resin A and the aliphatic polyamide resin B; the relative viscosity of the semi-aromatic polyamide resin A; the phosphorus atom concentration, the alkali metal atom concentration (particularly, the sodium atom concentration, the potassium atom concentration, and lithium atom concentration), and alkaline earth metal atom concentration (particularly, the calcium atom concentration and the magnesium atom concentration) contained in the semi-aromatic polyamide resin A; and the number average molecular weight of the semi-aromatic polyamide resin A; cylinder temperature, flow path temperature, and die temperature during molding; residence time during molding; and the like. The residence time is defined as the time required from when the polyamide resin in the hopper reaches the root part of the screw of the extruder until the polyamide resin exits the die. By forming a hard region formed of such a semi-aromatic polyamide resin A, an easily tearable film with excellent linear cuttability can be provided.

The area fraction is measured according to the method described in the examples below.

Additional Additive

The easily tearable film of the present invention is molded from a composition containing polyamide resin components including the semi-aromatic polyamide resin A and the aliphatic polyamide resin B. The composition may consist merely of the polyamide resin components or may contain an additional component.

Examples of the additional component include polyamide resins other than the polyamide resin components; thermoplastic resins other than the polyamide resin components; and additives, such as fillers, matting agents, heat resistant stabilizers, weather resistant stabilizers, antioxidants, ultraviolet absorbers, plasticizers, flame retardants, antistatic agents, anti-coloration agents, anti-gelling agents, impact modifiers, lubricants, colorants, and electrically conductive additives. One type each, or two or more types of these additives may be contained. Details thereof can be considered with reference to the description in paragraphs [0130] to [0155] of JP 4894982 B, the contents of which are incorporated in the present specification.

An embodiment of the present invention is exemplified by an easily tearable film that is substantially free of an additional phosphorus atom-containing compound other than the phosphorus atom-containing compound contained in the polyamide A. "Substantially free" refers to that the content of the additional phosphorus atom-containing compound is 1 mass % or less of the phosphorus atom-containing compound contained in the polyamide A, and the content is preferably 0.1 mass % or less.

In the easily tearable film of the present invention, preferably 90 mass % or more and more preferably 95 mass % or more of the resin components constituting the film are the polyamide resin components (the semi-aromatic polyamide resin A and the aliphatic polyamide resin B).

In addition, in the easily tearable film of the present invention, preferably 90 mass % or more and more preferably 95 mass % or more of the components constituting the film are constituted of the resin components (such as the polyamide resin components, an additional polyamide resin, an additional thermoplastic resin, and an impact modifier).

Stretching

In the easily tearable film of the present invention, the polyamide resin film is stretched. The stretching may be uniaxial stretching or biaxial stretching but is preferably biaxial stretching. When the film is uniaxially stretched, the stretch ratio is preferably from 1.1 to 5.0 times, more preferably from 1.8 to 4.0 times, and still more preferably from 2.5 to 3.5 times. In the case of biaxial stretching, the film is stretched preferably in the TD direction and the MD direction each at the above stretch ratio. In the case of biaxial stretching, a total stretch ratio obtained by multiplying the stretch ratios of the TD direction and the MD direction is preferably from 1.2 to 25 times, more preferably from 3.2 to 16 times, and still more preferably from 6.3 to 12.3 times.

Characteristics of Easily Tearable Film

The easily tearable film of the present invention can have an oxygen permeability coefficient at 23° C. and a relative humidity of 60% of 0.32 cc·mm/(m$^2$·day·atm) or less, even 0.30 cc·mm/(m$^2$·day·atm) or less, and particularly 0.29 cc·mm/(m$^2$·day·atm) or less. The lower limit value of the oxygen permeability coefficient at 23° C. and relative humidity of 60% is desirably 0 cc·mm/(m$^2$·day·atm), but even 0.1 cc·mm/(m$^2$·day·atm) or higher can sufficiently satisfy the required performance. With such a range, a film that can be more suitably used as a food packaging material is obtained.

Method for Producing Easily Tearable Film

The easily tearable film of the present invention is obtained by molding a composition containing the semi-aromatic polyamide resin A and the aliphatic polyamide resin B into a film shape to form a polyamide resin film and stretching the polyamide resin film. The stretching is preferably biaxial stretching.

For the production of the polyamide resin film of the present invention, the residence time, for example, at 280° C. or higher in the extruder is exemplified by 1 to 10 minutes, and it is preferably from 1 to 7 minutes and more preferably from 2 to 5 minutes. In addition, the residence time at lower than 280° C. in the extruder can be 15 minutes or longer and even 19 minutes or longer. The upper limit of the residence time is, for example, 25 minutes or shorter.

The method for producing a stretched film can be considered with reference to the description in WO 2017/010390.

The easily tearable film of the present invention can be used as a monolayer film. The thickness of the easily tearable film of the present invention only needs to be appropriately selected according to the application and is not particularly limited. However, in terms of film strength, impact resistance, barrier properties, ease of dry lamination, and cost, the thickness can be from 10 to 50 μm, even from 12 to 40 μm, and particularly from 14 to 30 μm.

The monolayer film can be preferably used in plastic wraps; or pouches of various shapes; container lid materials; and packaging containers, such as bottles, cups, trays, and tubes. Details of the container will be described below.

The present invention also discloses a multilayer film including the easily tearable film of the present invention. Furthermore, the present invention discloses a multilayer film including a polyester resin layer, the easily tearable film of the present invention, and a polyolefin resin layer in this order. The polyester resin is preferably a polyethylene terephthalate resin, and the polyolefin resin is preferably a polypropylene resin and a polyethylene resin.

Production methods of these multilayer films are exemplified by methods, such as a dry lamination method involving adhering a polyester resin film, the easily tearable film of the present invention, and a polyolefin resin film in this order with an adhesive or the like, and a method involving coextruding a composition containing the semi-aromatic polyamide resin A and the aliphatic polyamide resin B, and a composition containing a polyolefin resin to produce a multilayer film.

The multilayer film can be preferably used in plastic wraps; or pouches of various shapes; container lid materials; and packaging containers, such as bottles, cups, trays, and tubes. Details of the container will be described below.

Figure 7:
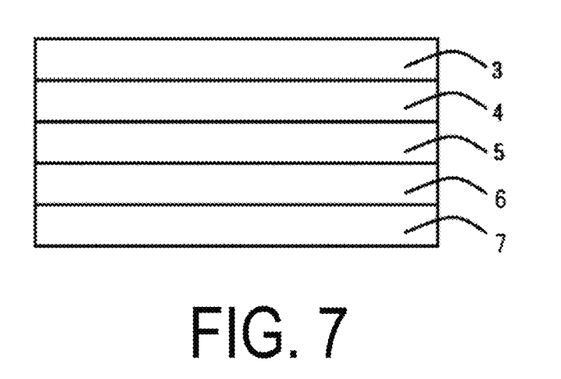
FIG. 7 is a schematic view illustrating an example of a multilayer film of the present invention.

FIG. 7 is an example of a multilayer film of the present invention, in which 3 is a polyester resin film, 4 is an adhesive layer, 5 is an intermediate layer (the easily tearable film of the present invention), 6 is an adhesive layer, and 7 is a polyolefin resin film. In FIG. 7, the adhesive layer 4 and the adhesive layer 6 each may be the same or different.

The polyester resin film is preferably a vapor deposited polyester resin film. The thickness of the polyester resin film is preferably from 8 to 50 μm and more preferably from 10 to 20 μm.

The polyolefin resin film is preferably a polyethylene resin film or a polypropylene resin film, and more preferably a polypropylene resin film. The thickness of the polyolefin resin film is preferably from 10 to 500 μm and more preferably from 20 to 100 μm.

The total thickness of the multilayer film of the present invention is preferably from 0.1 to 2.5 mm.

The adhesive layer is preferably an adhesive for dry lamination having adhesiveness. Examples of the adhesive for dry lamination include one-part urethane-based adhesives in which a urethane-based adhesive including an isocyanate group is used alone; and two-part urethane-based adhesives which are used by mixing two liquids, a main agent including a hydroxyl group and a curing agent including an isocyanate group; and in particular, two-part urethane-based adhesives are preferred.

The thickness of the adhesive layer is preferably from 2 to 30 μm, more preferably from 3 to 20 μm, and still more preferably from 4 to 10 μm in terms of ensuring mechanical strength of the multilayer film while exhibiting practical adhesive strength.

In addition, a sealant layer may be disposed on one or both surfaces of the stretched laminated film of the present invention. Various flexible polymer films having heat sealability can be used as a film material constituting the sealant layer, and the film material only needs to be appropriately selected among them according to the purpose and application. In view of exhibiting good heat sealability, preferably used are a low-density polyethylene, a high-density polyethylene, a linear low-density polyethylene, a polypropylene, a polybutene, a copolymer thereof, an ionomer resin, an ethylene-acrylic acid copolymer, an ethylene-vinyl acetate copolymer, a modified polyolefin resin, and a mixture thereof. Among them, a low-density polyethylene, a high-density polyethylene, a linear low-density polyethylene, and a polypropylene are preferably used. The surface of these films may be subjected to a surface treatment of various types, such as flame treatment and corona discharge treatment. The thickness of the sealant layer is preferably in the range from 5 to 300 μm, more preferably from 5 to 100 μm, and still more preferably from 5 to 80 μm.

The present invention also discloses a packaging material including the easily tearable film of the present invention or the multilayer film of the present invention. The packaging material of the present invention can be preferably used in plastic wraps; or pouches of various shapes; container lid materials; and packaging containers, such as bottles, cups, trays, and tubes.

The container (preferably a multilayer container) can contain and store an article of various types preferred to visualize the content to enhance customers' purchase desire. Examples thereof include processed marine products, processed livestock products, rice, and liquid foods. In particular, the container is suitable for storing foods that are heat-sterilized at high temperature of 100° C. or higher and are susceptible to the influence of oxygen. Details thereof can be considered with reference to the description in paragraphs [0032] to [0035] of JP 2011-37199 A, the contents of which are incorporated in the present specification.

EXAMPLES

The present invention will be described more specifically with reference to examples below. Those described in the examples below, such as materials, amounts used, proportions, processing contents, and processing procedures, may be changed as appropriate as long as the change does not depart from the spirit of the present invention. Thus, the scope of the present invention is not limited to the specific examples described below.

Semi-Aromatic Polyamide Resin A (Polyamide A)
Synthesis of Polyamide A1

To 8.9 kg of adipic acid, 7.8 g of sodium hypophosphite monohydrate and 4.0 g of sodium acetate were added, and the mixture was heated and melted at 170° C. and 0.1 MPaA in a reactor, then 8.2 kg of metaxylylenediamine was gradually added dropwise over 2 hours while the content was being stirred, and the temperature was increased to 250° C. After the temperature was increased, the pressure was slowly reduced to 0.08 MPaA over 1 hour and maintained for 0.5 hours. After completion of the reaction, the content in a strand shape was removed and pelletized with a pelletizer, and 15 kg of pellets were obtained. The resulting pellets were charged in a tumbler (a rotary vacuum chamber) including an outer cover for heating a heating medium, heating at 200° C. was continued for 1 hour under reduced pressure (from 0.5 to 10 Torr) to subject the resulting pellets to solid phase polymerization, and a polyamide A1 (MXD6, melting point 237° C., number average molecular weight (Mn) 15643, phosphorus concentration 4.9 μmol/g, sodium concentration 8.1 μmol/g, and moisture content 0.05 mass %) was obtained.

Synthesis of Polyamide A2

Synthesis was performed in the same manner as in the synthesis of the polyamide A1 with the exception that 8.3 kg of metaxylylenediamine was added dropwise, and a polyamide A2 (MXD6, melting point 237° C., number average molecular weight (Mn) 22863, phosphorus concentration 4.9 μmol/g, sodium concentration 8.1 μmol/g, and moisture content 0.05 mass %) was obtained.

Synthesis of Polyamide A3

Synthesis was performed in the same manner as in the synthesis of the polyamide A1 with the exception that 8.3 kg of metaxylylenediamine was added dropwise and the solid phase polymerization was performed at 200° C. for 2 hours, and a polyamide A3 (MXD6, melting point 237° C., number average molecular weight (Mn) 34762, phosphorus concentration 4.9 μmol/g, sodium concentration 8.1 μmol/g, and moisture content 0.05 mass %) was obtained.

Synthesis of Polyamide A4

Synthesis was performed in the same manner as in the synthesis of the polyamide A1 with the exception that 0.3 g of sodium hypophosphite monohydrate and 0.1 g of sodium acetate were added and 8.3 kg of metaxylylenediamine was added dropwise, and a polyamide A4 (MXD6, melting point 237° C., number average molecular weight (Mn) 22462, phosphorus concentration 0.2 μmol/g, sodium concentration 0.3 μmol/g, and moisture content 0.05 mass %) was obtained.

Measurement of Phosphorus Atom Concentration, Alkali Metal Atom Concentration, and Alkaline Earth Metal Atom Concentration The phosphorus atom concentration, the alkali metal atom and alkaline earth metal atom concentrations of the polyamide A were measured according to the following method.

In a container made of polytetrafluoroethylene, 0.2 g of the polyamide A and 8 mL of 35 mass % aqueous nitric acid solution were placed and subjected to a microwave decomposition at an internal temperature of 230° C. for 30 minutes. The decomposition liquid was adjusted to a predetermined volume with ultrapure water and this solution was used as an ICP (trace element extraction) measurement solution. The resulting measurement solution was measured by ICP emission spectroscopy for the phosphorus atom concentration, and the concentrations of alkali metal atoms (periodic table group 1 atoms, i.e., lithium, sodium, potassium, rubidium, cesium, and francium) and alkaline earth metal atoms (periodic table group 2 atoms, i.e., beryllium, magnesium, calcium, strontium, barium, and radium).

In the present examples, the microwave decomposition was carried out using ETHOS One available from Milestone General. An ICP emission spectrophotometer ICPE-9000 available from Shimadzu Corporation was used.

Measurement of Number Average Molecular Weight (Mn)

In a mixed solvent of phenol/ethanol=4/1 (volume ratio), 0.3 g of the polyamide resin A was added and stirred at 20 to 30° C. to be completely dissolved. Then, under stirring, the inner wall of the vessel was rinsed with 5 mL of methanol, and the terminal amino group concentration [NH$_2$] was determined by neutralization titration with 0.01 mol/L aqueous hydrochloric acid solution. In addition, 0.3 g of the polyamide resin was added in benzyl alcohol and stirred at 160 to 180° C. under a nitrogen stream to be completely dissolved. Then, the mixture was cooled to 80° C. or lower under a nitrogen stream. Under stirring, the inner wall of the vessel was rinsed with 10 mL of methanol, and the terminal carboxyl group concentration [COOH] was determined by neutralization titration with 0.01 mol/L aqueous sodium hydroxide solution. The number average molecular weight was determined from the measured terminal amino group concentration [NH$_2$] (unit: μeq/g) and the measured terminal carboxyl group concentration [COOH] (unit: μeq/g) by the following equation.

Number average molecular weight (Mn)=2000000/ ([COOH]+[NH$_2$])

Aliphatic Polyamide Resin B (Polyamide B)

B1: Polyamide 6, UBE Nylon 1024B, available from Ube Industries, Ltd., relative viscosity of 3.5

B2: Polyamide 6,66, Novamid 2030FC, available from DSM Co., Ltd., relative viscosity of 2.7

B3: Polyamide PA12, UBE Nylon 3030U, available from Ube Industries, Ltd., relative viscosity of 2.3

Example 1

An easily tearable film was produced using a film extruder including a single-screw extruder with 25 mmϕ and L/D=25 (PTM25, available from Research Laboratory of Plastics Technology Co., Ltd.), a head equipped with a 600-mesh filter, and a T-die; and a take-up device equipped with a cooling roll, a winding machine, and the like.

The extruder was set at 280° C., and the die temperature was set at the temperature shown in Table 1. After 30 mass % of the polyamide A3 and 70 mass % of the polyamide B1 were dry-blended, the blend was charged into the extruder. The screw rotation number was set at 15 rpm, and the polyamide resin composition was extruded into a film shape with the residence time shown in Table 1. The take-up speed was adjusted, and an unstretched film (polyamide resin film) having a width of 15 cm and a thickness of 180 μm was obtained.

The resulting unstretched film was retained in a clip simultaneous biaxial stretching machine at a preheating spray temperature of 90° C. and a preheating furnace body temperature of 95° C. for 10 seconds. Thereafter, the film was stretched 3.0 times in the vertical axis direction and 3.0 times in the horizontal axis direction and then subjected to a heat fixation treatment in a tenter oven at 210° C. for 30 seconds.

The resulting biaxially stretched film (easily tearable film, thickness of 20 μm) was evaluated for linear cuttability. The obtained results are shown in Table 1.

Area Fraction Corresponding to Polyamide Resin A Observed in Secondary Electron Image Observation The resulting unstretched polyamide resin film was embedded in an epoxy resin, then cut in the TD direction with a microtome, and the TD cross section was exposed as a smooth surface. Thereafter, the smooth surface was irradiated with an ion beam to form a morphology-derived damage pattern on the sample surface, and the surface was observed using scanning electron microscope (SEM) at a magnification of 30000×. The surface observation image of the polyamide resin A present in an observed region of 2.7 μm×4.3 μm was binarized, and the area fraction corresponding to the polyamide resin A was calculated.

Irradiation of Ion Beam

The ion beam was radiated under conditions of an accelerating voltage of 0.8 kV, a discharge voltage of 1.5 kV, a processing time of 6 minutes, an irradiation angle of 80 degrees, and an amount of eccentricity of 1.5 mm.

An ion beam IM4000, available from Hitachi High-Technologies Corporation, IM4000 was used.

SEM Observation Conditions

Measurement conditions for the SEM observation are the following conditions.

Accelerating voltage: 1.0 kV

Working distance: 8.0 mm

Observation magnification: 30000×

Scanning electron microscope SU8020 available from Hitachi High-Technologies Corporation was used.

Evaluation Method of Linear Cuttability

A straight line was drawn in the MD direction of the resulting biaxially stretched film, and two straight lines were drawn in the TD direction. The distance between the two straight lines in the TD direction was 20 cm. The displacement width (unit: mm) in the TD direction when the film was torn 20 cm in the MD direction was defined as the linear cuttability. A smaller value indicates better linear cuttability.

Oxygen Permeability Coefficient

The easily tearable film obtained above was measured for oxygen permeability coefficient under an atmosphere of 23° C. and a relative humidity (RH) of 60% by an isopiestic method in accordance with ASTM-D3985.

The oxygen permeability coefficient was measured using an oxygen permeability coefficient measuring device (product name: "OX-TRAN (trade name) 2/21", available from MOCON, Inc.).

Examples 2 to 6 and Comparative Examples 1 and 2

In Example 1, the types and blending amounts of the polyamide A and the polyamide B, and the residence time in the molding machine were changed as shown in Table 1 or Table 2, and others were performed in the same manner.

For Example 3, a secondary observation image (magnification: 30000×) when a sample subjected to a cutting treatment by ion milling on the TD cross section of the unstretched film was observed by SEM for a secondary electron image is illustrated in FIG. 5A. FIG. 5B is an image that identified regions derived from the polyamide A in FIG. 5A.

Comparative Example 3

In Example 1, the types and blending amounts of the polyamide A and the polyamide B were changed as shown in Table 2, the extruder was set at 290° C., and the die temperature was set at the temperature shown in Table 1, and others were performed in the same manner.

A secondary observation image (magnification: 30000×) when a sample subjected to a cutting treatment by ion milling on the TD cross section of the unstretched film was observed by SEM for a secondary electron image is illustrated in FIG. 6A. FIG. 6B is an image that identified regions derived from the polyamide A in FIG. 6A.

Comparative Example 4

In Example 1, the types and blending amounts of the polyamide A and the polyamide B were changed as shown in Table 2, the molding method of the easily tearable film was changed as follows, and others were performed in the same manner.

Molding of Easily Tearable Film

An easily tearable film was produced using a film extruder including a 25-mmϕ single-screw extruder, a head equipped with a 600-mesh filter, and a T-die; and a take-up device equipped with a cooling roll, a winding machine, and the like.

The extruder was set at 280° C. and the T-die was set at 285° C. After 10 mass % of the polyamide A4 and 90 mass % of the polyamide B1 were dry-blended, the blend was charged into the extruder. The screw rotation number was set at 15 rpm, and the polyamide resin composition was extruded into a film shape with a residence time of 5 minutes. The take-up speed was adjusted, and an unstretched film having a width of 15 cm and a thickness of 180 μm was obtained.

When the resulting unstretched film was biaxially stretched in the same manner as in Example 1 in a clip simultaneous biaxial stretching machine, the film broke during stretching, and a biaxially stretched film was not obtained. Accordingly, the stretching conditions were changed. That is, the resulting unstretched film was retained at a preheating spray temperature of 170° C. and a preheating furnace body temperature of 170° C. for 5 seconds, then the film was stretched 3.0 times in the vertical axis direction and 3.0 times in the horizontal axis direction, and then subjected to a heat fixation treatment in a tenter oven at 210° C. for 30 seconds. The resulting film was measured for area fraction, linear cuttability, and the oxygen permeability coefficient in the same manner as described above.

TABLE 1

|  |  | Unit | Example 1 | Example 2 | Example 3 | Example 4 | Example 5 |
|---|---|---|---|---|---|---|---|
| Mass ratio (polyamide A/polyamide B) |  |  | 30/70 | 30/70 | 30/70 | 40/60 | 30/70 |
| Polyamide A |  |  | A3 | A4 | A4 | A4 | A4 |
| Polyamide B |  |  | B1 | B1 | B1 | B1 | B2 |
| Die temperature |  | ° C. | 285 | 285 | 285 | 285 | 285 |
| Residence time |  | min | 5 | 5 | 2 | 5 | 5 |
| Properties of polyamide A | P | μmol/g | 4.9 | 0.2 | 0.2 | 0.2 | 0.2 |
|  | Na | μmol/g | 8.1 | 0.3 | 0.3 | 0.3 | 0.3 |
|  | K | μmol/g | 0 | 0 | 0 | 0 | 0 |
|  | Ca | μmol/g | 0 | 0 | 0 | 0 | 0 |
|  | Mn | — | 34762 | 22462 | 22462 | 22462 | 22462 |
| Area fraction corresponding to polyamide A observed in secondary electron image observation |  | % | 14.2 | 15.2 | 17.1 | 21.3 | 21.6 |
| Linear cuttability |  | mm | 3.8 | 3.3 | 1.9 | 1.6 | 3.4 |
| Oxygen permeability coefficient |  | cc · mm/(m$^2$ · day · atm) | 0.28 | 0.25 | 0.20 | 0.15 | 0.24 |

TABLE 2

|  |  | Unit | Example 6 | Comparative Example 1 | Comparative Example 2 | Comparative Example 3 | Comparative Example 4 |
|---|---|---|---|---|---|---|---|
| Mass ratio (polyamide A/polyamide B) |  |  | 30/70 | 30/70 | 30/70 | 30/70 | 10/90 |
| Polyamide A |  |  | A4 | A1 | A2 | A4 | A4 |
| Polyamide B |  |  | B3 | B1 | B1 | B1 | B1 |
| Die temperature |  | ° C. | 285 | 285 | 285 | 290 | 285 |
| Residence time |  | min | 5 | 5 | 5 | 5 | 5 |
| Properties of polyamide A | P | μmol/g | 0.2 | 4.9 | 4.9 | 0.2 | 0.2 |
|  | Na | μmol/g | 0.3 | 8.1 | 8.1 | 0.3 | 0.3 |
|  | K | μmol/g | 0 | 0 | 0 | 0 | 0 |
|  | Ca | μmol/g | 0 | 0 | 0 | 0 | 0 |
|  | Mn | — | 22462 | 15643 | 22863 | 22462 | 22462 |
| Area fraction corresponding to polyamide A observed in secondary electron image observation |  | % | 24.6 | 8.9 | 9.0 | 0.7 | 5.1 |
| Linear cuttability |  | mm | 2.2 | 6.0 | 6.1 | 14.9 | 10.0 |
| Oxygen permeability coefficient |  | cc · mm/(m$^2$ · day · atm) | 3.0 | 0.34 | 0.35 | 0.50 | 0.55 |

Only Na and K concentrations are described in the table for the alkali metal atom concentration of the polyamide A, but no other alkali metal atom was detected in all the examples and the comparative examples. In addition, only Ca concentration is described in the table for the alkaline earth metal atom concentration, but no other alkaline earth metal atom was detected.

As is clear from the above results, the easily tearable film of the present invention was found to have excellent linear cuttability (Examples 1 to 6). In contrast, resin films having an area fraction corresponding to the semi-aromatic polyamide resin A observed in secondary electron image observation of less than 9.8% after the plane ion milling were found to have poor linear cuttability (Comparative Examples 1 to 4).

This is also apparent from FIG. 4. FIG. 4 is a plot showing the relation between the polyamide A-derived area fractions of the resin films by the SEM observation and the linear cuttabilities in Examples 1 to 6 and Comparative Examples 1 to 4, where the cross marks represent Comparative Examples and the diamond marks represent Examples. It is apparent that resin films having the area fraction of 9.8% or more have significantly improved linear cuttability.

Figure 5:
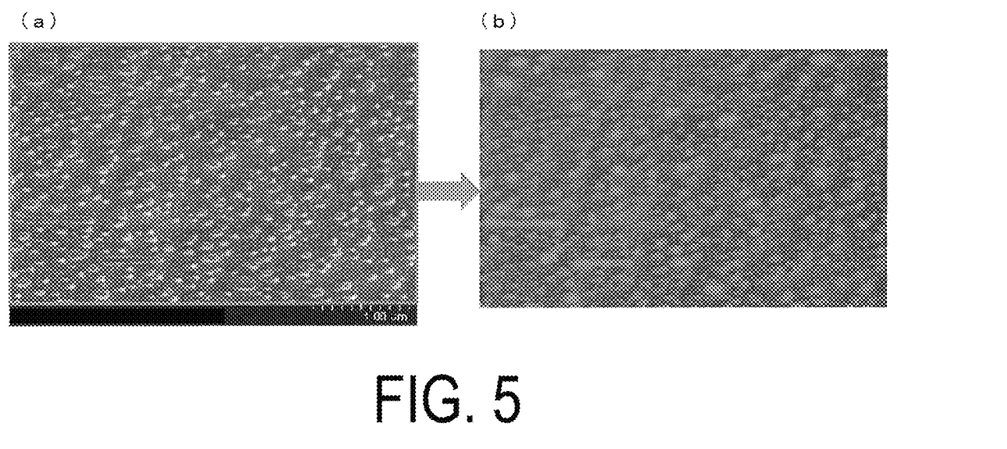
FIG. 5 is a secondary electron observation image observed by SEM after a cross section of the unstretched polyamide resin film of Example 3 of the present invention in the TD direction was cut by plane ion milling.
Figure 6:
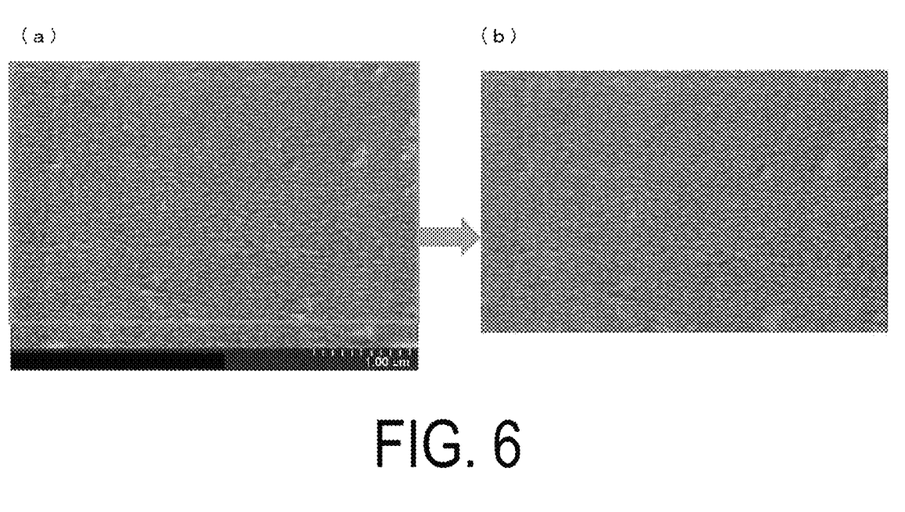
FIG. 6 is a secondary electron observation image observed by SEM after a cross section of the unstretched polyamide resin film of Comparative Example 3 of the present invention in the TD direction was cut by plane ion milling.

In addition, as is clear from the comparison of FIG. 5, which is a secondary electron micrograph of Example 3, and FIG. 6, which is a secondary electron micrograph of Comparative Example 3, it was found that the region derived from the semi-aromatic polyamide resin A was thick in Example 3, while in Comparative Example 3, the region derived from the semi-aromatic polyamide resin A was miscible with the aliphatic polyamide resin B, and the region derived from the semi-aromatic polyamide resin A was less present.

REFERENCE SIGNS LIST

1 Linear region observed in reflected electron image of polyamide resin film
2 Linear region observed in secondary electron image of polyamide resin film
3 Polyester resin layer
4 Adhesive layer
5 Intermediate layer
6 Adhesive layer
7 Polyolefin resin layer

The invention claimed is:

1. An easily tearable film, which is a polyamide resin film comprising polyamide resin components comprising more than 20 parts by mass and 70 parts by mass or less of a semi-aromatic polyamide resin A and less than 80 parts by mass and 30 parts by mass or more of an aliphatic polyamide resin B, with the proviso that a sum of the semi-aromatic polyamide resin A and the aliphatic polyamide resin B is 100 parts by mass;
wherein the semi-aromatic polyamide resin A is constituted of a diamine-derived constituent unit and a dicarboxylic acid-derived constituent unit;
60 mol % or more of the diamine-derived constituent units are derived from metaxylylenediamine;
60 mol % or more of the dicarboxylic acid-derived constituent units are derived from an $\alpha,\omega$-linear aliphatic dicarboxylic acid having from 4 to 10 carbons;
the polyamide resin film is stretched, the polyamide resin film having an area fraction corresponding to the semi-aromatic polyamide resin A, as observed in secondary electron image observation, of 9.8% or more after plane ion milling of a cross section of the polyamide resin film in the TD direction;
wherein the semi-aromatic polyamide resin A has a molar concentration of phosphorus atoms from 0.01 to 10 a molar concentration of sodium atoms from 0.05 to 20 µmol/g, a molar concentration of potassium atoms of 20 µmol/g or less, a molar concentration of calcium atoms of 10 µmol/g or less, and a number average molecular weight from 19000 to 50000; the aliphatic polyamide resin B comprises polyamide 6; and
wherein a constituent unit including a linear alkylene chain having 5 carbons accounts for 80 mol % or more of all the constituent units of the aliphatic polyamide resin B,
wherein the easily tearable film is stretched at least in a machine direction (MD) by a factor of 3.0 to 5.0 times.

2. The easily tearable film according to claim 1, wherein the area fraction is from 9.8 to 35.0%.

3. The easily tearable film according to claim 1, wherein 60 mol % or more of the dicarboxylic acid-derived constituent units are derived from adipic acid.

4. A multilayer film comprising the easily tearable film described in claim 1.

5. The multilayer film according to claim 4, comprising a polyester resin layer, the easily tearable film, and a polyolefin resin layer in this order.

6. A packaging material comprising the easily tearable film described in claim 1.

7. A container comprising the easily tearable film described in claim 1.

8. A packaging material comprising the multilayer film described in claim 4.

9. A container comprising the multilayer film described in claim 4.

10. The easily tearable film according to claim 1, wherein the constituent unit including a linear alkylene chain having 5 carbons accounts for 90 mol % or more of all the constituent units of the aliphatic polyamide resin B.

* * * * *

UNITED STATES PATENT AND TRADEMARK OFFICE
CERTIFICATE OF CORRECTION

PATENT NO. : 11,873,401 B2
APPLICATION NO. : 16/635445
DATED : January 16, 2024
INVENTOR(S) : Otsuka et al.

Page 1 of 1

It is certified that error appears in the above-identified patent and that said Letters Patent is hereby corrected as shown below:

In the Claims

In Column 22, Claim 1, Line 16, delete "to 10" and insert -- to 10 µmol/g, --, therefor.

Signed and Sealed this
Second Day of September, 2025

Coke Morgan Stewart
*Acting Director of the United States Patent and Trademark Office*